US008905817B2

(12) United States Patent
Rowe et al.

(10) Patent No.: US 8,905,817 B2
(45) Date of Patent: Dec. 9, 2014

(54) CLAMPING ASSEMBLY FOR A WATERJET

(75) Inventors: Eugene N. Rowe, Butler, PA (US);
Daryl L. Vettori, Saxonburg, PA (US)

(73) Assignee: Penn United Technologies, Inc., Cabot, PA (US)

( * ) Notice: Subject to any disclaimer, the term of this patent is extended or adjusted under 35 U.S.C. 154(b) by 989 days.

(21) Appl. No.: 12/883,405

(22) Filed: Sep. 16, 2010

(65) Prior Publication Data
US 2011/0065366 A1 Mar. 17, 2011

Related U.S. Application Data

(60) Provisional application No. 61/242,939, filed on Sep. 16, 2009.

(51) Int. Cl.
*B24C 1/00* (2006.01)
*B24C 3/00* (2006.01)

(52) U.S. Cl.
USPC ............ 451/38; 451/90; 451/365; 83/53; 83/177; 269/32; 269/55

(58) Field of Classification Search
USPC ........ 451/38, 39, 40, 75, 90, 365; 83/53, 177; 269/32, 34, 43, 45, 55, 291
See application file for complete search history.

(56) References Cited

U.S. PATENT DOCUMENTS

| 3,667,166 | A | * | 6/1972 | White | 451/213 |
| 3,939,747 | A | * | 2/1976 | Harcuba et al. | 83/637 |
| 4,660,406 | A | * | 4/1987 | Rugh et al. | 72/448 |
| 5,505,653 | A | * | 4/1996 | Nedo et al. | 451/5 |
| 6,155,245 | A | * | 12/2000 | Zanzuri | 125/12 |
| 6,222,155 | B1 | * | 4/2001 | Blackmon et al. | 219/121.39 |
| 7,544,112 | B1 | * | 6/2009 | Miller et al. | 451/2 |
| 7,591,615 | B2 | * | 9/2009 | Li et al. | 408/67 |
| 7,896,726 | B1 | * | 3/2011 | Miller et al. | 451/2 |
| 8,365,714 | B2 | * | 2/2013 | Gifford et al. | 125/13.01 |
| 2009/0064832 | A1 | * | 3/2009 | Caretta et al. | 83/76.7 |
| 2009/0288532 | A1 | * | 11/2009 | Hashish | 83/53 |
| 2010/0120332 | A1 | * | 5/2010 | Miller | 451/5 |
| 2011/0277740 | A1 | * | 11/2011 | Gifford et al. | 125/13.01 |
| 2013/0025422 | A1 | * | 1/2013 | Chillman et al. | 83/53 |

* cited by examiner

*Primary Examiner* — Eileen P. Morgan
(74) *Attorney, Agent, or Firm* — Eckert Seamans Cherin & Mellott, LLC; David C. Jenkins

(57) ABSTRACT

An air-actuated clamping assembly that is quickly actuated to secure a workpiece in place during machining operations, such as on a waterjet machine. The clamping operation is completed within seconds after a workpiece is placed (for example, when used in conjunction with a waterjet machine) onto the waterjet machine slats. The system greatly minimizes set-up time, allows for an adjustable clamping force, allows for one operator to set up workpieces, keeps the workpiece firmly in place and prevents movement during the machining process, is adaptable to various waterjet brands and models, and is air-actuated so that typical "house air" can be utilized.

18 Claims, 5 Drawing Sheets

CLAMPING ASSEMBLY FOR A WATERJET

CROSS REFERENCE TO RELATED APPLICATION

This application claims priority under 35 U.S.C. §119(e) to U.S. Provisional Patent Application Ser. No. 61/242,939, filed Sep. 16, 2009 entitled CLAMPING SYSTEM.

BACKGROUND OF THE INVENTION

1. Field of the Invention

The present invention relates to a clamping assembly and, more specifically, to an air-actuated clamping assembly used in conjunction with a waterjet.

2. Background Information

A waterjet is used to cut metal in an abrasive jet machining process. The waterjet sprays a cutting fluid, typically water filled with abrasive particles, at an extremely high pressure onto a workpiece. The force of the fluid, along with the abrasive particles, is sufficient to cut through the workpiece. The workpiece is typically in the form of a flat plate or a sheet of metal, plastic or other rigid material; other workpiece configurations may be used, however. The workpiece is disposed on a generally flat, horizontal bed formed of spaced vertical slats. A high pressure nozzle is structured to move over the bed. The waterjet further includes a reservoir of abrasive, typically powdered garnet. The abrasive reservoir is in fluid communication with a water conduit and/or the nozzle. Water is pumped through the water conduit at a very high pressure. The abrasive is combined with the water flow in either the water conduit and/or the nozzle where the cutting fluid emerges as a spray.

The cutting fluid spray is typically applied at a right angle to the sheet-like workpiece. That is, the nozzle is typically structured to move in a plane that is substantially parallel to the bed. The position of the waterjet nozzle is typically controlled by a computer which follows a geometry provided by an operator. Thus, during the machining process it is necessary to secure the workpiece in order to substantially prevent movement. That is, the workpiece cannot move more than an insubstantial amount or the waterjet nozzle will apply the spray to the wrong location on the workpiece.

Typically, the product produced by this machining process is the component cut from the workpiece. These components fall from the workpiece in between the slats on the waterjet bed into a fluid (water and the cutting fluid) filled reservoir. Alternately, the product may be the workpiece that remains on the waterjet bed. A sheet having openings may, for example, be used as a seal or gasket.

Accordingly, a technician must secure each workpiece to the waterjet bed. This activity is often referred to as the "set-up" time. Typically, during the set-up time the technician must place the workpiece on the waterjet bed, then align and secure the workpiece. Securing the workpiece is accomplished by applying at least one clamp, and typically a plurality of clamps, to the workpiece. These clamps are generally manual clamps that must be positioned and secured by the technician. Given that the waterjet nozzle is typically computer controlled and may operate quickly, the set-up time may represent a significant portion of the total cutting operation. Further, the technician must ensure that the abrasive reservoir does not run low of abrasive.

With the prior art method of clamping there are several inherent negative manufacturing issues. First, prior art methods are time consuming. An operator can be required to take anywhere from about a minute to ten minutes (or more) in order to properly secure a workpiece. Total set-up time in an operator's day is especially affected when an operator has to perform many different individual set-up operations (often required when there are small lot sizes of varying sized parts being manufactured). Second, such clamping procedures require awkward operations due to the size and nature of the raw material being used, and often require more than one person to assist with the set-up operations. That is, the inherent nature of working with certain large plates presents obvious disadvantages when using manual traditional clamping techniques. Also, at times, two operators are needed for certain clamping set-ups.

Third, with prior art clamping methods, the workpiece can at times loosen and become crooked during the machining process. That is, traditional clamping techniques can, at times, result in the workpiece becoming loose if the operator does not properly adjust manual clamping assemblies to create an optimal clamping scenario. Thus, before or during the cutting operation the workpiece may become crooked, which, in turn causes dimensional inaccuracies.

In order to address the above-described issues pertaining to the prior art, it would be a welcomed addition in the art to provide an apparatus and process that can avoid the shortcomings in the prior art (such as improving the efficiency of set-up time, minimizing awkwardness, and providing improved clamping), thus driving down the overall cost of manufacturing.

SUMMARY OF THE INVENTION

The present invention provides a clamping assembly structured to clamp a generally rigid, flat plate or sheet, which is typically metal or plastic, to a waterjet bed. It is noted that such workpieces, i.e. sheets of raw material, typically have substantially straight edges. Further, the waterjet bed typically has substantially straight edges. The workpiece, however, is typically smaller than the waterjet bed. The clamping assembly is structured to bias the workpiece against one of the edges of the waterjet bed, typically, but not necessarily the edge closest to the waterjet operator/technician.

The clamping assembly includes an elongated, generally straight clamping bar and an air cylinder assembly. The clamping bar is mounted on one edge of the waterjet bed and is structured to extend generally parallel to the opposing edge of the waterjet bed. The air cylinder assembly is structured to move the clamping bar between a retracted position, wherein the clamping bar does not engage the workpiece, and an extended position, wherein the clamping bar engages the workpiece and biases the workpiece against the opposing edge of the waterjet bed. Because the workpiece has substantially straight edges, the act of biasing the workpiece between two parallel elements, i.e. the clamping bar and the edge of the waterjet bed, both aligns and clamps the workpiece. Because the clamping assembly is automatic, the duration of the set-up time is greatly reduced. Further, the automated system operates in a consistent manner which may allow for an automatic feed assembly for the workpieces.

After the workpiece is placed by an operator on the bed of a waterjet machine, the operator can then activate the air cylinder assembly's control valve in order to commence the automated clamping operation. The air cylinder assembly moves the clamping bar in the direction of the workpiece. The motion of the air cylinder is relatively rapid, contacting the workpiece within seconds. After the initial contact, the clamping bar applies sufficient force to the workpiece to move the workpiece against the opposing waterjet bed edge, thereby securing the workpiece in place for the abrasive jet machining process. When machining is complete, the operator can activate the air cylinder assembly's control valve in order to release the clamping assembly from applying force to the workpiece. The air cylinder assembly retracts the clamping bar from the workpiece, and the operator may move (or remove) the workpiece.

If the product is/are the pieces cut from the workpiece, the product falls through the waterjet bed into a fluid reservoir. The reservoir may include a removable basket. The basket is preferably a wire basket. The basket is disposed sufficiently deep in the reservoir so that, after the spray cuts through the workpiece, the force of the spray is sufficiently dissipated by the fluid in the reservoir to the point the spray does not damage the basket.

It is further noted that the clamp assembly may be adapted to fit existing waterjets and may be moved between existing waterjets. That is, the clamp assembly may be made to be removably coupled to many different waterjet beds. Further, the air cylinder may be adapted to be coupled to "house air," i.e. a compressed air system commonly used in manufacturing facilities and having standardized couplings. The present invention also provides a method for adjusting the clamping force of the clamping assembly, to be controlled by the operator. This is accomplished by adjusting the pressure in the air cylinder using an included air pressure regulator.

BRIEF DESCRIPTION OF THE DRAWINGS

The foregoing summary, as well as the following detailed description of the clamp assembly will be better understood when read in conjunction with the appended figures.

DETAILED DESCRIPTION OF THE INVENTION

It is to be understood that the Figures and descriptions of the present invention have been simplified to illustrate elements that are relevant for a clear understanding of the present invention, while eliminating, for purposes of clarity, other elements. Those of ordinary skill in the art will recognize that other elements may be desirable in order to implement the present invention. However, because such elements are well known in the art, and because they do not facilitate a better understanding of the present invention, a discussion of such elements is not provided herein.

As used herein, "coupled" means a link between two or more elements, whether direct or indirect, so long as a link occurs.

As used herein, "directly coupled" means that two elements are directly in contact with each other.

As used herein, "fixedly coupled" or "fixed" means that two components are coupled so as to move as one while maintaining a constant orientation relative to each other.

As used herein, directional terms, such as, but not limited to, "front," "back," "right," "left," "upper," "lower," etc. correspond to the orientation of the waterjet. That is, a waterjet typically includes a control panel which is located near the "front" of the waterjet.

As used herein, and when discussing the orientation of a frame assembly, "roll" corresponds to rotation about a longitudinal axis, "pitch" corresponds to rotation about a lateral axis, and "yaw" corresponds to rotation about a generally vertical axis.

Figure 1:
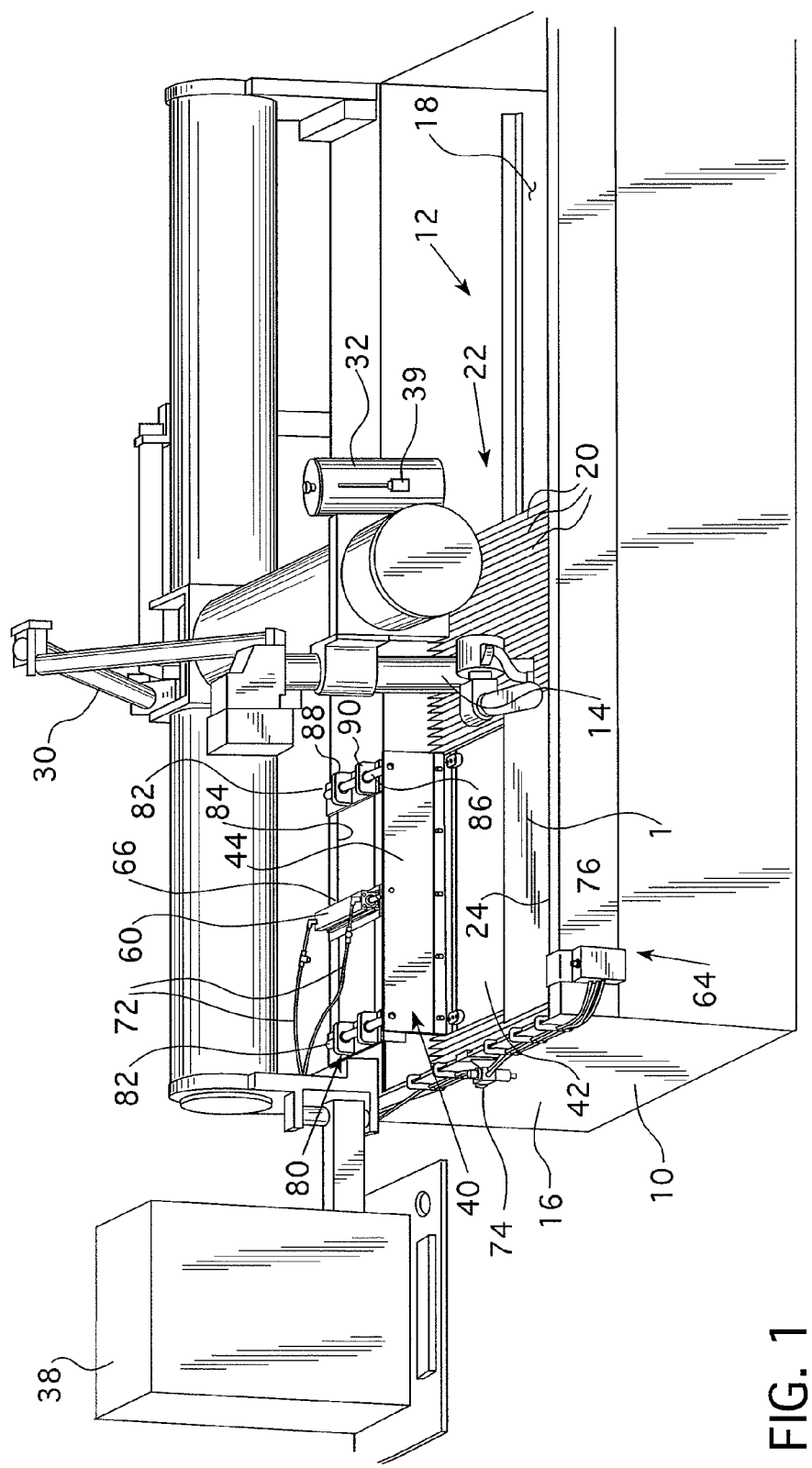
FIG. 1 is an isometric view of a waterjet and clamp assembly.
Figure 2:
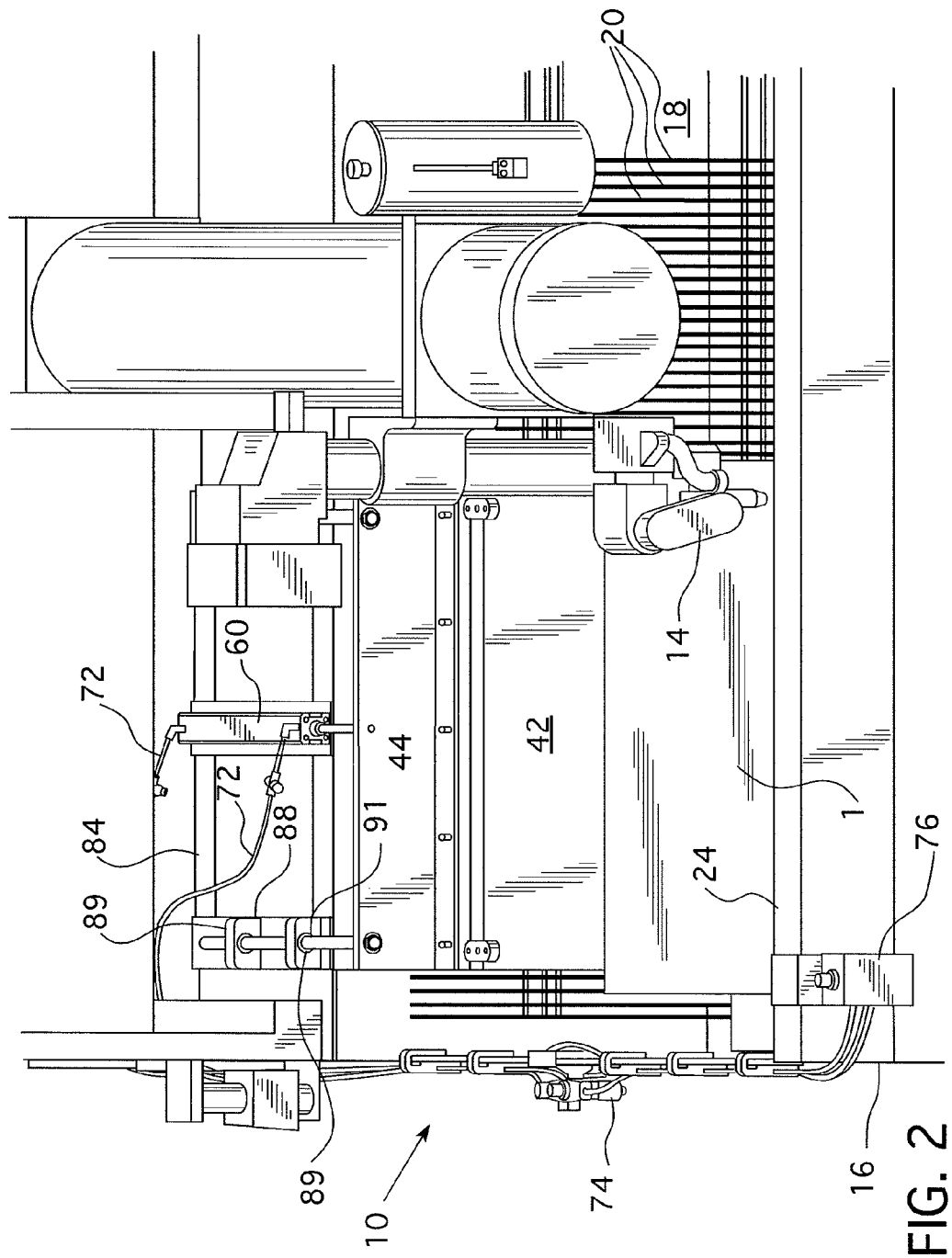
FIG. 2 is an isometric detailed view of the primary clamping components comprising the clamping assembly, as well as the location of a workpiece.
Figure 3:
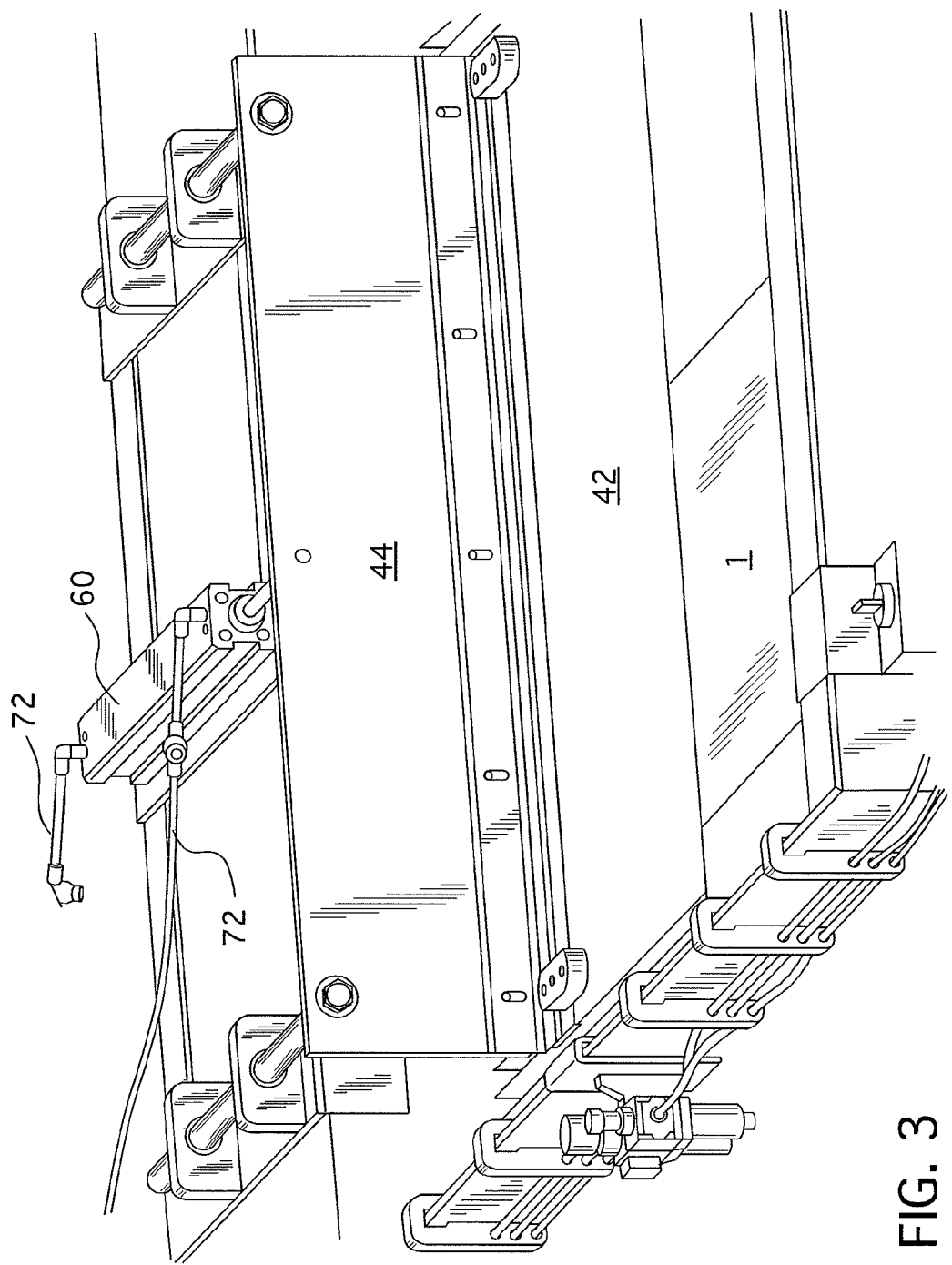
FIG. 3 is another isometric view of the clamp system.
Figure 4:
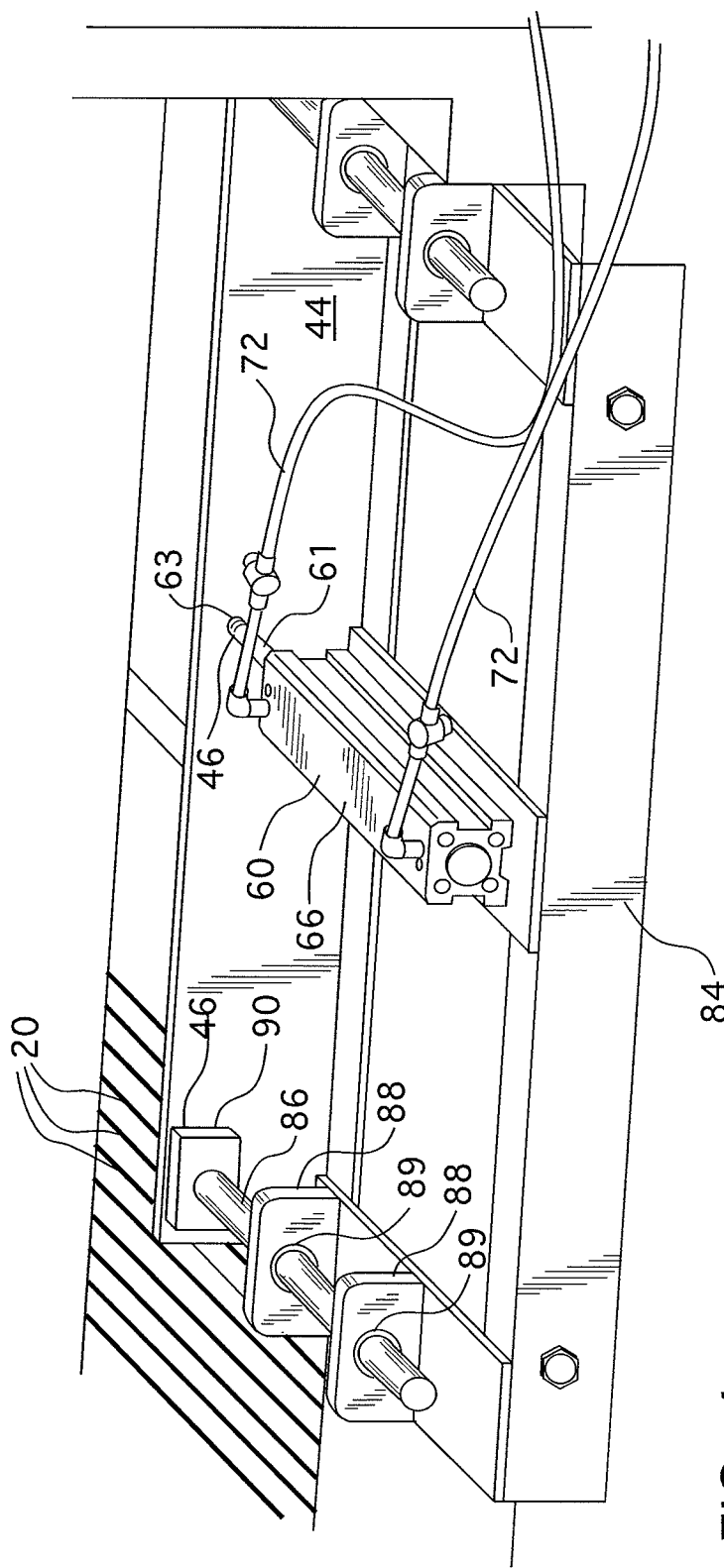
FIG. 4 is a rear view of the clamp assembly on a waterjet machine.

As shown in FIG. 1, a waterjet 10 typically includes a bed assembly 12 and a nozzle assembly 14. The bed assembly 12 includes a housing 16 defining a reservoir 18 for a liquid. The bed assembly 12 further includes a plurality of slats 20 which form a bed 22, i.e. a generally planar surface defined by the upper surface of the slats 20. The slats 20 are, typically, flat, thin, and elongated members made of metal. The slats 20 are oriented so that a long, thin edge is disposed at the top of the bed 22. The slats 20 are spaced from each other so that cut product and/or scrap may fall between the slats 20 into the reservoir 18. The upper surface of the bed 22, when the slats are new, is generally flat. The housing 16 defines a generally vertical, upwardly extending edge 24 that extends around the bed 22. Alternately, the bed assembly 12 may include a mounting frame (not shown). The mounting frame is coupled to the housing 16 and/or bed 22 and extends, generally, about the circumference of the bed 22 or a portion of the bed 22. Such a mounting frame is typically structured or shaped to support a specific workpiece 1, discussed below. That is, for example, if the workpiece 1 forms a product like a gasket, and, if that gasket has a particular exterior profile, the mounting frame may have a corresponding profile. Thus, the exterior profile of the workpiece 1 may be cut, or cast, prior to the time the workpiece 1 is on the waterjet 10. By matching the workpiece 1 exterior profile to the mounting frame, the workpiece 1 will be aligned. Thereafter, the clamp assembly 40 (discussed below) maintains the workpiece 1 in place.

The nozzle assembly 14 includes a water supply conduit 15 (shown schematically), which is coupled to a water supply (not shown), a high pressure pump (not shown), a movable arm assembly 30, a particulate reservoir 32 (FIG. 9), and a nozzle (not shown). The particulate reservoir 32 is structured to contain a particulate abrasive, such as, but not limited to, powdered garnet. The particulate reservoir 32 is in fluid communication with the water supply conduit at a point downstream of the high pressure pump. In operation, the particulate abrasive is incorporated into the water at the nozzle, thereby creating a cutting fluid. The nozzle is coupled to, and in fluid communication with, the water conduit at a point downstream of the high pressure pump and the mixing chamber. The nozzle is structured to spray the cutting fluid in a controlled manner, typically in a thin, line-like pattern. The direction of the spray as it exits the nozzle is considered to be the longitudinal axis of the nozzle/spray.

The cutting fluid only acts as cutting fluid when the particulate abrasive is included in the fluid. Thus, when the particulate reservoir 32 is empty, or below a predetermined amount of particulate abrasive, the cutting fluid is ineffective. To ensure the waterjet 10 does not operate when the particulate reservoir 32 is below a predetermined amount of particulate abrasive, a sensor 39 may be included. The particulate reservoir sensor 39 provides a signal to the movable arm assembly control system 38, discussed below, when the particulate reservoir 32 is below a predetermined amount of particulate abrasive. When the movable arm assembly control system 38 receives a signal indicating a low level of abrasive, the cutting operations are discontinued until the particulate reservoir 32 is refilled.

The nozzle is mounted on the movable arm assembly 30. The movable arm assembly 30 is structured to move the nozzle over the bed 22. Typically, the nozzle and/or the spray is structured to be generally normal, i.e. generally perpendicular to, the plane of the bed 22. The nozzle/spray may be adapted to pitch and yaw about the longitudinal axis of the nozzle/spray. The movable arm assembly 30 typically moves the nozzle in a plane that is generally parallel to the upper surface of the bed 22. The nozzle may also be moved vertically relative to the upper surface of the bed 22.

In operation, the nozzle sprays the cutting fluid with a sufficient force to cut a workpiece 1. The cutting fluid may also erode the upper surface of the slats 20 which form the bed 22. This erosion shall hereinafter be ignored and it is assumed that the bed 22 has a generally planar upper surface.

The movable arm assembly 30 further includes a control system 38. The movable arm assembly control system 38 is structured to position the nozzle and control the flow of the cutting fluid through the nozzle. The movable arm assembly control system 38 typically includes a computer (or other programmable logic circuit) and at least one control routine (none shown).

Figure 5:
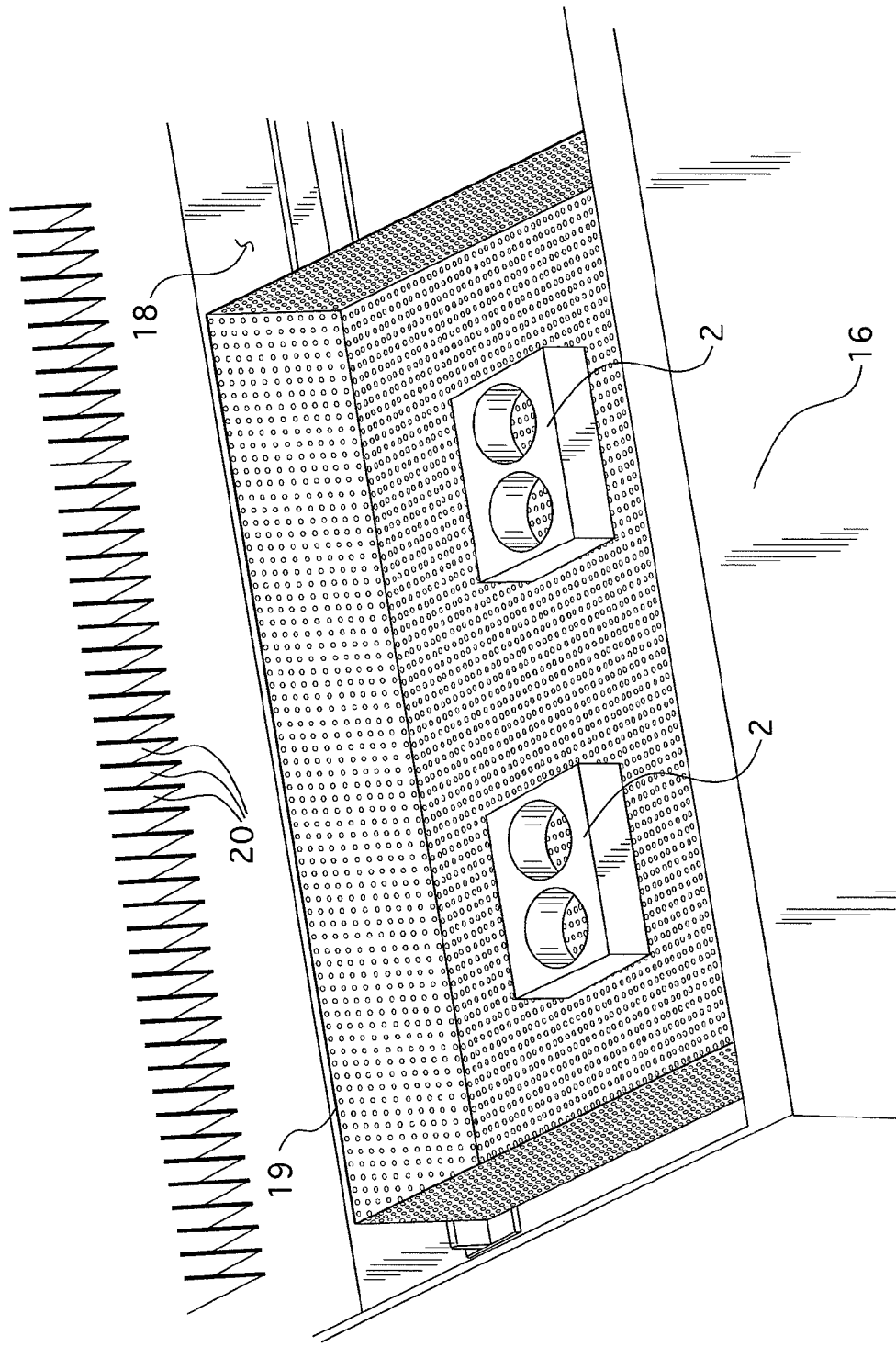
FIG. 5 is an isometric view of the wire basket.

The workpiece 1 is, typically, a planar member of a rigid material. The workpiece 1 is typically metal or plastic. The workpiece 1 is disposed on the bed 22 and the nozzle moves above the workpiece 1. As the nozzle sprays the cutting fluid, the cutting fluid cuts the workpiece 1. The desired product 2 (FIG. 5) may be either, and on some occasions, both, the portions that are cut from the workpiece 1 and/or the portion that remains on the bed 12. If the product 2 is the cut portion, the product typically falls between the slats 20 into the reservoir 18. The reservoir 18 may include a basket 19, preferably made from a mesh or wire, structured to capture the product 2. The reservoir 18 has a sufficient depth so that the force of the spray is dissipated by the liquid in the reservoir 18 to the point where the spray does not erode the basket 19.

To ensure that the workpiece 1 is held secure during the cutting operation, a clamp assembly 40 is provided. The clamp assembly 40 may be incorporated into the waterjet 10, or may be a portable device that can be moved between different waterjets 10. As shown in FIGS. 1-3 and 7, the clamp assembly 40 includes a primary plate 42, a mounting plate 44, a coupling 46 and an air cylinder assembly 60. The clamp assembly 40 may include an alignment assembly 80. As shown, the clamp assembly 40 is coupled to, or positioned by, the back side of the waterjet 10, but as will become clear when the operation of the clamp assembly 40 is discussed, below, the clamp assembly 40 may be coupled to, positioned by, any side of the waterjet 10.

The primary plate 42 is, preferably, an elongated rigid plate. The primary plate 42 is structured to move, and typically slide, across the bed 22. The mounting plate 44 extends generally perpendicular to the plane of the primary plate 42 and is, preferably, fixed to the back edge of the primary plate 42. The mounting plate 44 is structured to allow the air cylinder assembly 60 to be coupled to the primary plate 42. That is, the coupling 46 is coupled to the back side of the mounting plate 44. The coupling 46 is structured to be coupled to the piston rod, described below. The mounting plate 44 preferably extends over most of the back edge of the primary plate 42 so as to provide an additional attachment surface for the alignment assembly 80. Alternately, the mounting plate 44 could be a mounting bracket (not shown) coupled to the primary plate 42.

The air cylinder assembly 60 includes an air actuated piston (not shown) and a control system 64. As is known, the air actuated piston includes an outer cylinder 66, and a rod 61 coupled to an inner piston member (not shown) disposed within the outer cylinder 66. The outer cylinder 66 is sealed on at least one end, typically the back end. The piston and associated rod 61 are structured to move between two positions, a first, retracted position, wherein the piston is disposed adjacent to the outer cylinder back end, and a second, extended position, wherein the piston is spaced from the outer cylinder 66 back end. As the piston moves, the rod 61 moves too. When a fluid, typically air, is introduced between the piston and the cylinder back end, the piston member is moved away from the cylinder back end, i.e. the piston moves to the extended position. When the fluid is removed from between the piston and the cylinder back end, the piston member is moved toward the cylinder back end, i.e. the piston moves to the retracted position. It is noted, the outer cylinder 66 may have two sealed ends and the fluid (air) may be alternately introduced to either side of the piston resulting in the desired motion. The piston rod 61 has a distal end 63 that extends from the outer cylinder 66. The piston rod distal end 63 is coupled to the coupling 46.

Thus, when the air cylinder assembly 60 is actuated, the piston rod 61 moves, either to the extended position of the retracted position. As the piston rod 61 moves, the primary plate 42 moves as well. As noted above, the workpiece 1 is typically a planar member of a rigid material. When the piston rod 61 moves toward the extended position, the primary plate 42 is moved into contact with the workpiece 1. As the piston rod 61 continues to move toward the extended position, the workpiece 1 is biased against the housing 16. That is, the workpiece 1 is clamped between the primary plate 42 and the housing 16 (or alternately against a mounting frame). Additionally, free-floating spacer plates (not shown) can be placed in between the primary plate 42 and the workpiece 1 to take up any "gap" which might be present.

The air cylinder assembly control system 64 includes a control valve (not shown), air hoses 72, a regulator 74, and a control device 76. The control device 76, which may be a knob as shown or an automatic actuator (not shown), is structured to open and close the control valve. The control valve is structured to be coupled to a source of compressed air (not shown). The regulator 74 is disposed between the control valve and the air cylinder assembly 60. The regulator 74 is structured to limit the pressure supplied to the air cylinder assembly 60, and therefore limit the force created by the primary plate 42 on the workpiece 1. The regulator 74 is, preferably, adjustable. The control valve, the regulator 74 and the air cylinder assembly 60 are coupled to each other by the air hoses 72.

The alignment assembly 80 is structured to substantially maintain the primary plate 42 in a single orientation. That is, by virtue of resting on the bed 22, the primary plate 42 cannot significantly roll or pitch relative to the longitudinal axis of the piston rod 61. The primary plate 42 may, however, yaw, depending upon the rigidity of the link between the piston rod 61, the coupling 46, and the primary plate 42. The alignment assembly 80 includes at least one alignment head assembly 82 and a rigid frame 84. The frame 84 is structured to support the air cylinder assembly 60 and the at least one alignment head assembly 82. Preferably, the air cylinder assembly 60 and the at least one alignment head assembly 82 are in a fixed position with substantially parallel longitudinal axes.

Preferably, the alignment assembly 80 includes two alignment head assemblies 82. Each alignment head assembly 82 includes a rod 86, at least one, and preferably two fixed mounting blocks 88 and a movable mounting block 90 (which is the coupling 46). The fixed mounting blocks 88 are coupled to the frame 84 and each includes a bearing 89 with an opening 90. The fixed mounting blocks openings 90 are aligned. The movable mounting block 90 is, preferably, elongated and fixed to the mounting plate 44. The movable mounting block 90 longitudinal axis extends generally perpendicular to the longitudinal axis of the piston rod 61. The alignment head assembly rod 86 is coupled to the movable mounting block 90 and is slidably disposed through the fixed mounting block bearing 89. The alignment head assembly rod 86 is substantially parallel to the piston rod 61. In this configuration, the alignment assembly 80 is structured to substantially maintain the primary plate 42 in a single orientation. If there are two alignment head assemblies 82, the alignment head assemblies 82 are preferably disposed on opposite sides of the air cylinder assembly 60.

Further, the frame 84 is preferably structured to be coupled to the waterjet 10. To accommodate waterjets 10 of different configurations, the frame 84 may have an adjustable length. That is, the back side of the waterjet housing 16 may have different lengths. The frame 84 is preferably structured to be adjustable to these lengths. The frame 84 may include a downwardly extending flange that is structured to be disposed over the back edge of the waterjet housing 16. The frame 84 may also include one or more fasteners structured to engage the waterjet housing 16. These screws may have an extended length to accommodate waterjets that have a thinner back side to the housing (thinner meaning the overall length/width, not the thickness of the material that forms the housing 16).

What is claimed is:

1. A clamping assembly for clamping a workpiece within a waterjet, said waterjet having an abrasive blast nozzle for cutting through said workpiece and having a housing defining a reservoir and having a generally flat bed overlying said said reservoir, said housing defining a generally vertical, upwardly extending edge that extends around said bed, said bed structured to support the workpiece to be cut by said waterjet, said clamping assembly comprising:
    a primary plate;
    an air cylinder assembly, said air cylinder assembly having a piston rod structured to move between a retracted position and an extended position;
    said air cylinder piston rod coupled to said primary plate;
    said primary plate structured to slide over said bed; and
    wherein, when said piston rod moves toward said extended position, said primary plate moves toward said housing thereby biasing said workpiece between said primary plate and against said housing edge to clamp workpiece during a cutting operation.

2. The clamping assembly of claim 1 wherein said clamping assembly includes an alignment assembly, said alignment assembly coupled to said primary plate.

3. The clamping assembly of claim 2 wherein:
    said alignment assembly includes at least one alignment head assembly and a frame;
    said frame coupled to, and structured to support, said air cylinder assembly and said at least one alignment head assembly;
    said alignment head assembly including a rod;
    said alignment head assembly rod extending substantially parallel to said piston rod;
    said alignment head assembly rod coupled to said primary plate; and
    whereby said alignment assembly is structured to substantially maintain said primary plate in a single orientation.

4. The clamping assembly of claim 3 wherein:
    said alignment head assembly including a fixed mounting block;
    said fixed mounting block having a bearing defining an opening; and
    said alignment head assembly rod movably disposed in said mounting block bearing.

5. The clamping assembly of claim 4 wherein:
    said alignment assembly further includes a movable mounting block, said movable mounting block being elongated;
    said movable mounting block coupled to said primary plate and disposed with the movable mounting longitudinal axis being substantially perpendicular to the longitudinal axis of said alignment head assembly rod; and
    said alignment head assembly rod coupled to said movable mounting block.

6. The clamping assembly of claim 5 further including a mounting plate, said mounting plate coupled to said primary plate and disposed perpendicular thereto.

7. The clamping assembly of claim 6 wherein said movable mounting block is fixed to said mounting plate.

8. The clamping assembly of claim 3 wherein said at least one alignment head assembly includes two alignment head assemblies.

9. A waterjet comprising:
    a housing defining a reservoir and a bed overlying said reservoir, said housing defining a generally vertical, upwardly extending edge that extends around said bed;
    an abrasive blast nozzle assembly disposed above said reservoir;
    said bed structured to support a workpiece to be cut by said nozzle assembly;
    a clamping assembly including a primary plate and an air cylinder assembly;
    said air cylinder assembly having a piston rod structured to move between a retracted position and an extended position;
    said air cylinder piston rod coupled to said primary place;
    said primary plate structured to slide over said bed; and
    wherein when said piston rod moves toward said extended position, said primary plate moves toward said housing thereby biasing said workpiece between said primary plate and against said housing edge to clamp workpiece during cutting operation.

10. The waterjet of claim 9 wherein:
    said nozzle assembly includes a water supply conduit and a particulate reservoir structured to hold an abrasive;
    said particulate reservoir in fluid communication with said water supply conduit whereby an abrasive is introduced into said water supply conduit creating a cutting fluid; and
    said particulate reservoir having a sensor structured to detect when said particulate reservoir is empty, or below a predetermined amount of particulate abrasive.

11. The waterjet of claim 9 wherein:
    said housing includes a basket disposed in said reservoir;
    said reservoir filled with a liquid; and
    said reservoir having a sufficient depth so that the force of a cutting spray from said nozzle is dissipated by the liquid in the reservoir to the point where said cutting spray does not erode the basket.

12. The waterjet of claim 11 wherein said clamping assembly includes an alignment assembly, said alignment assembly coupled to said primary plate.

13. The waterjet of claim 12 wherein:
    said alignment assembly includes at least one alignment head assembly and a frame;
    said frame coupled to, and structured to support said air cylinder assembly and said at least one alignment head assembly;
    said alignment head assembly including a rod;
    said alignment head assembly rod extending substantially parallel to said piston rod;

said alignment head assembly rod coupled to said primary plate; and whereby said alignment assembly is structured to substantially maintain said primary plate in a single orientation.

14. The waterjet of claim 13 wherein:

said alignment head assembly including a fixed mounting block;

said fixed mounting block having a bearing defining an opening; and said alignment head assembly rod movably disposed in said mounting block bearing.

15. The waterjet of claim 14 wherein:

said alignment assembly further includes a movable mounting block, said movable mounting block being elongated;

said movable mounting block coupled to said primary plate and disposed with the movable mounting longitudinal axis being substantially perpendicular to the longitudinal axis of said alignment head assembly rod; and said alignment head assembly rod coupled to said movable mounting block.

16. The waterjet of claim 15 further including a mounting plate, said mounting plate coupled to said primary plate and disposed perpendicular thereto.

17. The waterjet of claim 16 wherein said movable mounting block is fixed to said mounting plate.

18. The waterjet of claim 13 wherein said at least one alignment head assembly includes two alignment head assemblies.

\* \* \* \* \*